United States Patent
Maeda et al.

(10) Patent No.: US 10,563,595 B2
(45) Date of Patent: Feb. 18, 2020

(54) CONTROL DEVICE OF INTERNAL COMBUSTION ENGINE

(71) Applicant: Honda Motor Co., Ltd., Tokyo (JP)

(72) Inventors: Tsuyoshi Maeda, Saitama (JP); Ken Kurahashi, Saitama (JP); Yuki Yamada, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 16/151,360

(22) Filed: Oct. 4, 2018

(65) Prior Publication Data

US 2019/0101066 A1    Apr. 4, 2019

(30) Foreign Application Priority Data

Oct. 4, 2017  (JP) ................. 2017-194060

(51) Int. Cl.
| | |
|---|---|
| *F02D 13/02* | (2006.01) |
| *F02D 41/00* | (2006.01) |
| *F02D 41/14* | (2006.01) |
| *F02D 41/38* | (2006.01) |

(52) U.S. Cl.
CPC ..... *F02D 13/0261* (2013.01); *F02D 41/0007* (2013.01); *F02D 41/1439* (2013.01); *F02D 41/1454* (2013.01); *F02D 41/38* (2013.01); *F02D 2041/389* (2013.01)

(58) Field of Classification Search
CPC .. F02D 13/0261; F02D 41/38; F02D 41/1439; F02D 41/1454; F02D 41/0007; F02D 2041/389; F02D 13/0219; F02D 41/1456; F02D 2041/1422; F02D 41/1483; F02D 41/1482; F02D 41/402; F02D 41/2454; F02D 41/1486; F02D 35/0092

USPC ..... 60/600, 602, 605.1, 611; 123/704, 559.1
See application file for complete search history.

(56) References Cited

U.S. PATENT DOCUMENTS

| | | | | |
|---|---|---|---|---|
| 7,523,744 | B2 * | 4/2009 | Ayame | F02D 41/0025 123/1 A |
| 8,495,865 | B2 * | 7/2013 | Okada | F02D 13/0257 123/90.15 |
| 2011/0126519 | A1 * | 6/2011 | Okada | F02D 13/0246 60/276 |
| 2014/0020664 | A1 * | 1/2014 | Yoshioka | F02B 33/00 123/559.1 |
| 2016/0348601 | A1 * | 12/2016 | Okubo | F02B 37/12 |

FOREIGN PATENT DOCUMENTS

WO    2014006721    1/2014

* cited by examiner

*Primary Examiner* — Hoang M Nguyen
(74) *Attorney, Agent, or Firm* — JCIPRNET (57) ABSTRACT

In the disclosure, an F/B correction coefficient correcting a fuel injection amount so that a detected equivalence ratio detected by an LAF sensor becomes a target equivalence ratio is calculated by using a feedback control containing a predetermined gain, and a reference F/B correction coefficient is further set. By changing a valve overlap characteristic between an intake valve and an exhaust valve in a supercharging state, a scavenging control that scavenges a combustion chamber by blow-by of intake air is executed. During the scavenging control, when the F/B correction coefficient is changing relative to the reference F/B correction coefficient in a direction of further correcting the fuel injection amount to a rich side, the gain of the feedback control is reduced.

12 Claims, 9 Drawing Sheets

CONTROL DEVICE OF INTERNAL COMBUSTION ENGINE

CROSS-REFERENCE TO RELATED APPLICATION

This application claims the priority benefit of Japan Application No. 2017-194060, filed on Oct. 4, 2017. The entirety of the above-mentioned patent application is hereby incorporated by reference herein and made a part of this specification.

BACKGROUND

Technical Field

The disclosure relates to a control device of an internal combustion engine, particularly to a control device utilizing valve overlap during which both an intake valve and an exhaust valve are open, executing a scavenging control that scavenges a combustion chamber by blow-by of intake air, and controlling an air-fuel ratio of a mixture during the scavenging control.

Related Art

The above-mentioned scavenging control facilitates discharge of combustion gas remaining in the combustion chamber and is effective in enhancing filling efficiency of intake air, and is performed by causing a portion of the intake air flowing in via the intake valve to blow through toward an exhaust passage via the exhaust valve in a valve overlap state in which the intake air is supercharged and both the intake valve and the exhaust valve are open. Meanwhile, air-fuel ratio feedback control, well-known as a control of internal combustion engines, is generally performed by detecting an air-fuel ratio of a mixture by an air-fuel ratio sensor disposed in the exhaust passage through exhaust gas that flows in, calculating a feedback correction value so that the detected air-fuel ratio becomes a target air-fuel ratio, and correcting a fuel injection amount by the feedback correction value.

From the above relationship, in a case where the air-fuel ratio feedback control is performed during the scavenging control, since the intake air blowing through the combustion chamber flows into the air-fuel ratio sensor together with the exhaust gas generated by combustion, an event occurs that the detected air-fuel ratio detected by the air-fuel ratio sensor is shifted to a lean side relative to an actual air-fuel ratio of the mixture. As a result, even if the actual air-fuel ratio matches the target air-fuel ratio, there is a risk that the feedback correction value may be calculated so as to correct the fuel injection amount to a rich side, such that the air-fuel ratio may be excessively enriched and misfire may be caused. This problem becomes particularly notable in a case where the air-fuel ratio sensor is disposed in a position in the exhaust passage that is relatively close to the combustion chamber since the influence of the intake air blowing through is increased.

As a conventional control device of an internal combustion engine that is intended to solve such a problem, one disclosed in WO 2014/006721, for example, has been known. In this control device, during a non-scavenging control period when no scavenging control is being executed, for each of a predetermined plurality of load regions, a learning value is calculated based on a calculated feedback correction value and stored in advance. During the scavenging control, a fuel injection amount is corrected using the learning value corresponding to the load region at that moment instead of using the feedback correction value. In addition, the scavenging control is prohibited if the calculation of the learning value corresponding to the load region is not completed. Furthermore, in this control device, during the scavenging control, leveling processing is performed on an output (the detected air-fuel ratio) from the air-fuel ratio sensor, and the fuel injection amount is subjected to feedback correction based on the above learning value and the output from the air-fuel ratio sensor that has undergone the leveling processing.

In the above-mentioned conventional control device, the learning value used in place of the feedback correction value during the scavenging control needs to be calculated and stored in advance during the non-scavenging control period for each of the load regions, and processing thereof is complex. In addition, since the scavenging control is prohibited if the calculation of the learning value corresponding to the present load region is not completed, advantages of the scavenging control cannot be obtained. Furthermore, since the output from the air-fuel ratio sensor undergoes the leveling processing during the scavenging control, if the learning value used at this moment is not properly calculated, a value in the vicinity of the improper learning value may continue to be used for a long period of time. Particularly, if the learning value is a value so as to excessively correct the air-fuel ratio to the lean side, there is a risk that lean exhaust gas may continuously flow into a catalyst for a long period of time, thereby causing an excessive rise in the temperature of the catalyst.

The disclosure provides a control device of an internal combustion engine, capable of well controlling an air-fuel ratio of a mixture during a scavenging control without excessively enriching the air-fuel ratio, while ensuring execution of the scavenging control by a relatively simple control.

SUMMARY

A first aspect of the disclosure provides a control device of an internal combustion engine 3, the internal combustion engine 3 including a supercharger (turbocharger 9 in the embodiments (the same applies hereinafter)) that supercharges intake air, and being capable of changing a valve overlap characteristic between an intake valve and an exhaust valve. The control device includes: an air-fuel ratio sensor (LAF sensor 33) provided upstream of a turbine 15 of the supercharger in an exhaust passage 8, detecting an air-fuel ratio of a mixture burning in a combustion chamber; a feedback correction value calculation part (ECU 2; step 6 in FIG. 4), calculating a feedback correction value (F/B correction coefficient KAF) for correcting a fuel injection amount GFUEL so that a detected air-fuel ratio (detected equivalence ratio KACT) detected by the air-fuel ratio sensor becomes a target air-fuel ratio (target equivalence ratio KCMD), by using a feedback control containing a predetermined gain (P-term gain Kp, I-term gain Ki and D-term gain Kd); a reference feedback correction value setting part (ECU 2), setting a reference feedback correction value (reference F/B correction coefficient KREFX) based on the feedback correction value; a scavenging control part (ECU 2; steps 15A and 15B in FIG. 5), executing a scavenging control that scavenges the combustion chamber by causing a portion of the intake air flowing into the combustion chamber via the intake valve to flow out via the exhaust valve, by changing the valve overlap characteristic into a predetermined characteristic for scavenging control, in a state in which the intake air is supercharged by the supercharger; and a gain reduction control part (ECU 2; steps 18 and 20 in FIG. 5), executing a gain reduction control that reduces the gain of the feedback control to be lower than during a normal control when the feedback correction value is changing relative to the reference feedback correction value in a direction of further correcting the fuel injection amount GFUEL to a rich side during execution of the scavenging control.

According to the disclosure, the air-fuel ratio of the mixture is detected by the air-fuel ratio sensor provided upstream of the turbine of the supercharger in the exhaust passage, and the feedback correction value for correcting the fuel injection amount so that the detected air-fuel ratio becomes the target air-fuel ratio is calculated by using the feedback control containing the predetermined gain. In addition, the reference feedback correction value is set based on the feedback correction value. Furthermore, in the state in which the intake air is supercharged by the supercharger, by changing the valve overlap characteristic between the intake valve and the exhaust valve into the predetermined characteristic for scavenging control, the scavenging control that scavenges the combustion chamber is executed. Then, during execution of the scavenging control, when the feedback correction value is changing relative to the reference feedback correction value in the direction of further correcting the fuel injection amount GFUEL to the rich side, the gain reduction control that reduces the gain of the feedback control to be lower than during the normal control is executed.

As previously described, during the scavenging control, a portion of the supercharged intake air blows through the combustion chamber and flows into the air-fuel ratio sensor, and the detected air-fuel ratio is shifted to the lean side relative to the actual air-fuel ratio of the mixture. Therefore, when the feedback control is performed based on the detected air-fuel ratio, even if the actual air-fuel ratio matches the target air-fuel ratio, there is a risk that the feedback correction value may be calculated so as to correct the fuel injection amount to the rich side, the air-fuel ratio may be excessively enriched, and misfire may be caused. In contrast, according to the disclosure, by executing the gain reduction control during the scavenging control, the gain of the air-fuel ratio feedback control is reduced to be lower than during the normal control. Accordingly, responsiveness of the feedback control is lowered, and a change in the feedback correction value is suppressed. Thus, the air-fuel ratio of the mixture can be well controlled without being excessively enriched, and misfire caused by excessive enrichment of the air-fuel ratio can be reliably prevented.

In addition, during the scavenging control, the gain reduction control is executed on the condition that the feedback correction value is changing relative to the reference feedback correction value in the direction of further correcting the fuel injection amount to the rich side. Accordingly, even during the scavenging control, in a case where the fuel injection amount and the air-fuel ratio are actually not corrected to the rich side, unnecessary gain reduction control is avoided, and an air-fuel ratio feedback control using a gain by the normal control and having high responsiveness can be performed.

Furthermore, since it is sufficient to just reduce the gain of the feedback control during the scavenging control, unlike the aforesaid conventional control device, the complex processing for calculating and storing in advance the learning value of the feedback correction value for each of a plurality of load regions is unnecessary. The above effects are obtained by a simple control, and execution of the scavenging control can be ensured.

Figure 9A:
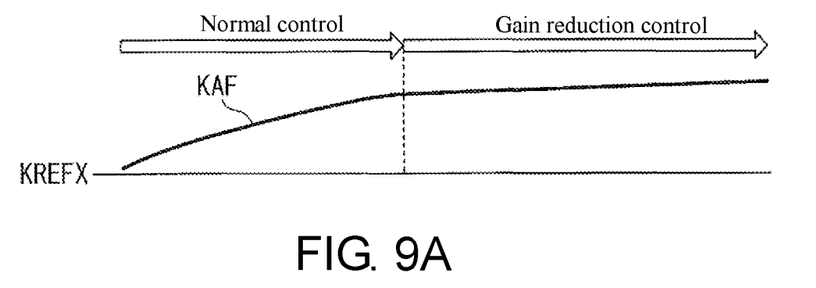
FIG. 9A and FIG. 9B show a contrast between setting conditions of a feedback (F/B) correction coefficient by the processing in FIG. 5 and FIG. 8.

According to a second aspect of the disclosure, the control device of the internal combustion engine according to the first aspect of the disclosure further includes an initial value setting part (ECU 2; FIG. 9A), setting an initial value of the feedback correction value at the start of the gain reduction control to the feedback correction value calculated by the feedback correction value calculation part.

According to this configuration, the initial value of the feedback correction value at the start of the gain reduction control is set to the feedback correction value calculated by the feedback correction value calculation part. Accordingly, at the start of the gain reduction control, the feedback correction value will not suddenly change; therefore, a sudden change in the fuel injection amount and the air-fuel ratio corrected by the feedback correction value, as well as occurrence of a torque level difference in the internal combustion engine arising therefrom, can be prevented.

Figure 8:
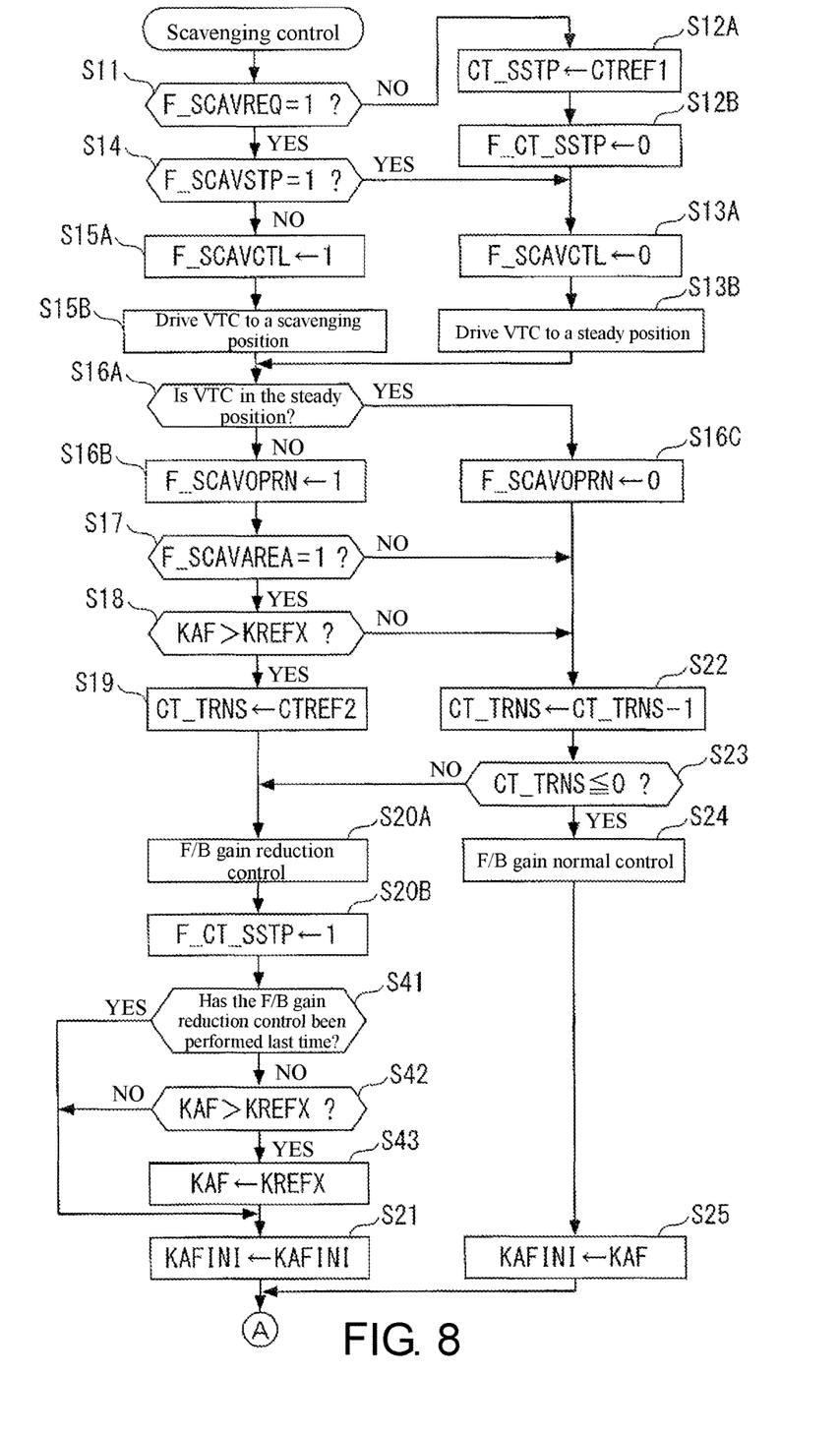
FIG. 8 is a flowchart showing a part of scavenging control processing according to a second embodiment.
Figure 9B:
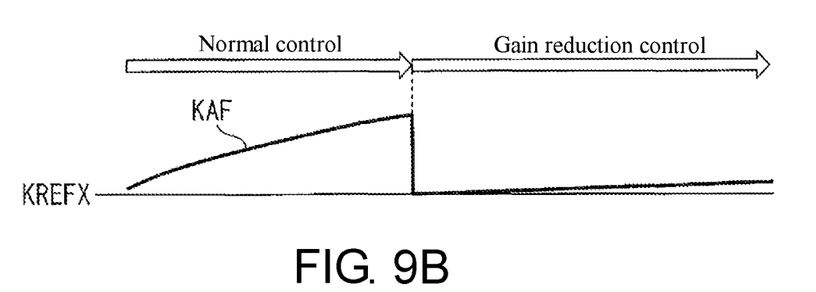

According to a third aspect of the disclosure, in the control device of the internal combustion engine according to the first aspect of the disclosure, the reference feedback correction value is a learning value of the feedback correction value calculated before the start of the scavenging control. The control device further includes an initial value setting part (ECU 2; step 43 in FIG. 8; FIG. 9B), setting an initial value of the feedback correction value at the start of the gain reduction control to the reference feedback correction value.

According to this configuration, the reference feedback correction value is the learning value of the feedback correction value calculated before the start of the scavenging control, and the initial value of the feedback correction value at the start of the gain reduction control is set to the reference feedback correction value. Therefore, even if the feedback correction value has been greatly changing to the rich side before the gain reduction control is started, the initial value of the feedback correction value at the start of the gain reduction control can be set without being affected by the above, and accordingly, the misfire caused by excessive enrichment of the air-fuel ratio can be reliably prevented.

According to a fourth aspect of the disclosure, in the control device of the internal combustion engine according to any one of the first to third aspects of the disclosure, the gain reduction control part terminates the gain reduction control (steps 19, 20 and 22-24 in FIG. 5) when a predetermined time (predetermined value CTREF2) has elapsed after termination of the scavenging control.

Immediately after termination of the scavenging control, even if the valve overlap characteristic has returned to a steady characteristic, fresh air caused by the scavenging remains in the exhaust passage. Therefore, when the processing is immediately switched to the normal control of the gain, there is a risk of the air-fuel ratio suddenly changing and being excessively enriched. According to this configuration, since the gain reduction control is terminated and the processing transitions to the normal control when the predetermined time has elapsed after the termination of the scavenging control, a sudden change in the air-fuel ratio at the transition can be prevented.

According to a fifth aspect of the disclosure, the control device of the internal combustion engine according to any one of the first to fourth aspects of the disclosure further includes a growth degree parameter calculation part (ECU 2; step 26 in FIG. 6) calculating a growth degree parameter (F/B correction coefficient growth rate R_KAFGRW) that indicates a degree of growth of the feedback correction value from the start of the gain reduction control. The scavenging control part terminates the scavenging control when the calculated growth degree parameter has exceeded a predetermined value RREF.

According to this configuration, the scavenging control is stopped when the above-mentioned growth degree parameter has exceeded the predetermined value. Accordingly, even though the gain reduction control has been executed, in a case where the growth of the feedback correction value from the start of the gain reduction control is becoming too large, by forcibly stopping the scavenging control, the misfire caused by excessive enrichment of the air-fuel ratio can be reliably prevented.

DESCRIPTION OF THE EMBODIMENTS

Figure 1:
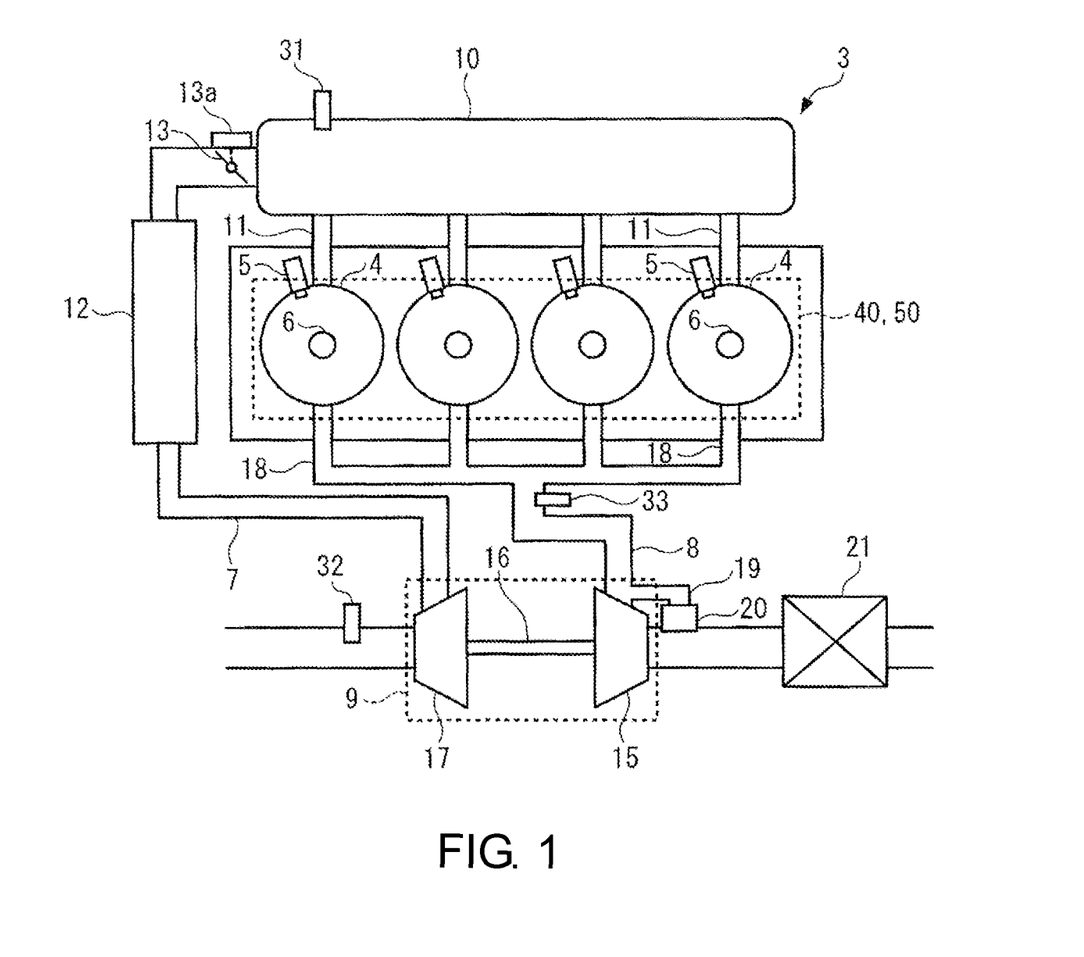
FIG. 1 schematically shows an internal combustion engine in which the disclosure is applied.

Hereinafter, embodiments of the disclosure are explained in detail with reference to the drawings. An internal combustion engine (hereinafter "engine") 3 shown in FIG. 1 is a direct injection type gasoline engine having four cylinders 4 and directly injecting fuel into a combustion chamber (not illustrated), and is mounted on a vehicle (not illustrated).

Figure 2:
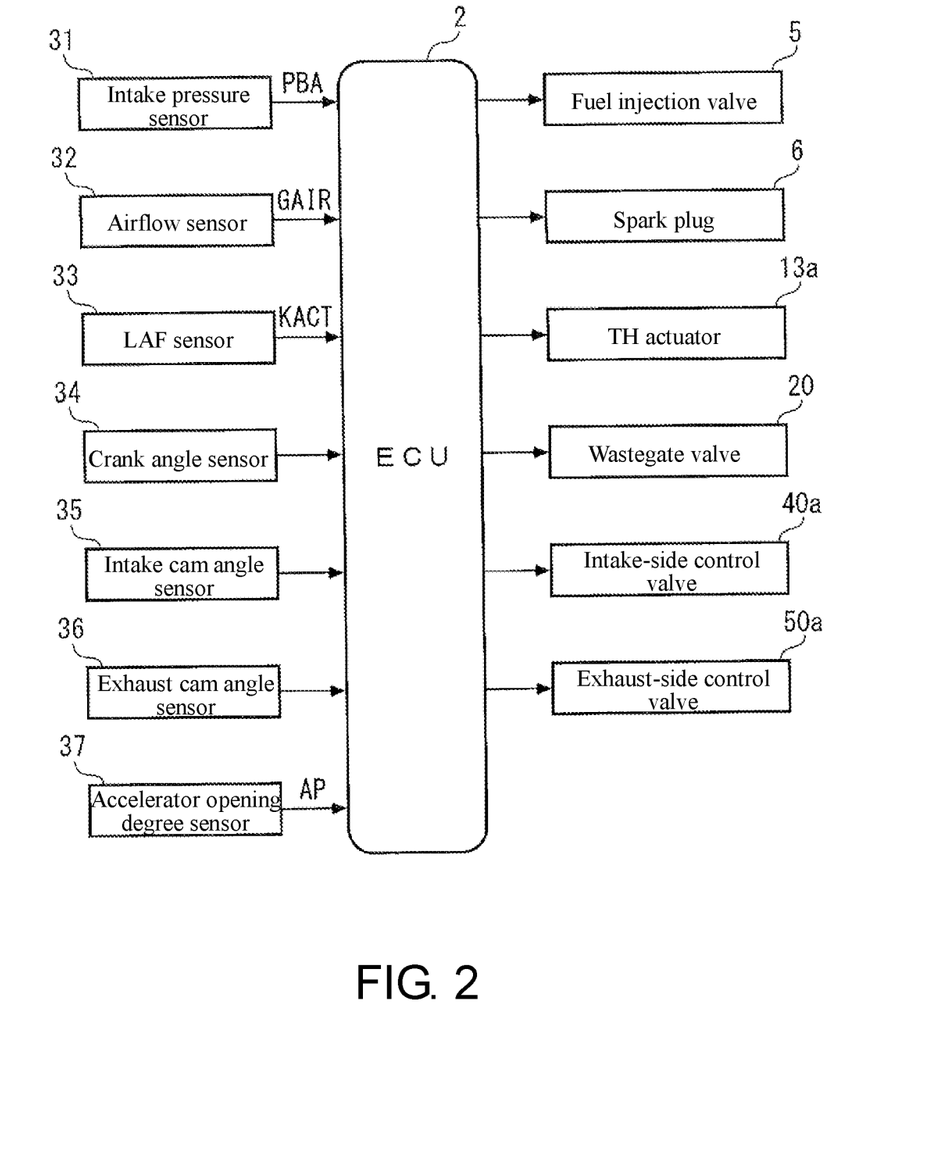
FIG. 2 is a block diagram showing a control device.

A fuel injection valve 5 and a spark plug 6 are provided in each cylinder 4. A valve open time of the fuel injection valve 5 is controlled by an electronic control unit (ECU) 2 (see FIG. 2), thereby controlling a fuel injection amount GFUEL. Ignition timing IG of the spark plug 6 is also controlled by the ECU 2.

In addition, the engine 3 includes an intake passage 7, an exhaust passage 8 and a turbocharger 9. The intake passage 7 is connected to a surge tank 10. The surge tank 10 is connected to the combustion chamber of each cylinder 4 via an intake manifold 11. In the intake passage 7, an intercooler 12 for cooling air pressurized by the turbocharger 9 and a throttle valve 13 disposed on a downstream side of the intercooler 12 are provided.

A throttle (TH) actuator 13a is connected to the throttle valve 13. By controlling operation of the TH actuator 13a by the ECU 2, an opening degree of the throttle valve 13 is controlled, thereby adjusting an amount of intake air taken into the combustion chamber. An intake pressure sensor 31 detecting an intake pressure PBA is provided in the surge tank 10. An airflow sensor 32 for detecting an intake air flow rate GAIR is provided in the intake passage 7.

The turbocharger 9 has a turbine 15 disposed in the exhaust passage 8 and rotationally driven by operation energy of exhaust gas, and a compressor 17 integrally connected to the turbine 15 via a shaft 16. The compressor 17 is disposed in the intake passage 7, pressurizing (compressing) the air that flows through the intake passage 7 and supercharging intake air.

The combustion chamber of each cylinder 4 of the engine 3 is connected to the exhaust passage 8 via an exhaust manifold 18. A lean air-fuel (LAF) sensor (air-fuel ratio sensor) 33 detecting an air-fuel ratio of a mixture burning in the combustion chamber is provided upstream of the turbine 15 in the exhaust passage 8, more specifically, in the most upstream portion of the exhaust passage 8 (immediately downstream of a collection portion of the exhaust manifold 18). The LAF sensor 33 detects the air-fuel ratio of the mixture through an oxygen concentration of the exhaust gas that flows in. Moreover, since the LAF sensor 33 actually detects the air-fuel ratio as an equivalence ratio (=theoretical air-fuel ratio/air-fuel ratio), a detected air-fuel ratio detected by the LAF sensor 33 is hereinafter called a detected equivalence ratio KACT.

In addition, a bypass passage 19 bypassing the turbine 15 is connected to the exhaust passage 8. In the bypass passage 19, an electric wastegate valve 20 is provided controlling a flow rate of the exhaust gas passing through the bypass passage 19. Operation of the wastegate valve 20 is controlled by the ECU 2 (see FIG. 2). Furthermore, an exhaust gas purification device 21 composed of a three-way catalyst (not illustrated) for purifying the exhaust gas discharged from the combustion chamber, or the like, is provided on a downstream side of the wastegate valve 20.

In addition, the engine 3 includes an intake valve (not illustrated), an exhaust valve (not illustrated) and a piston (not illustrated) for each cylinder 4, and also includes a variable intake valve driving mechanism 40 driving the intake valve to open and close, and a variable exhaust valve driving mechanism 50 driving the exhaust valve to open and close. The variable intake valve driving mechanism 40 has a well-known configuration, and continuously varies an operating phase (hereinafter "intake phase") CAIN of the intake valve between the most retarded phase shown by solid line L1 in FIG. 3 and the most advanced phase shown by broken line L2 in FIG. 3, by varying a phase of an intake camshaft (not illustrated) with respect to a crankshaft (not illustrated). By controlling an intake-side control valve 40a by a driving signal from the ECU 2, operation of the variable intake valve driving mechanism 40 is controlled (see FIG. 2).

Figure 3:
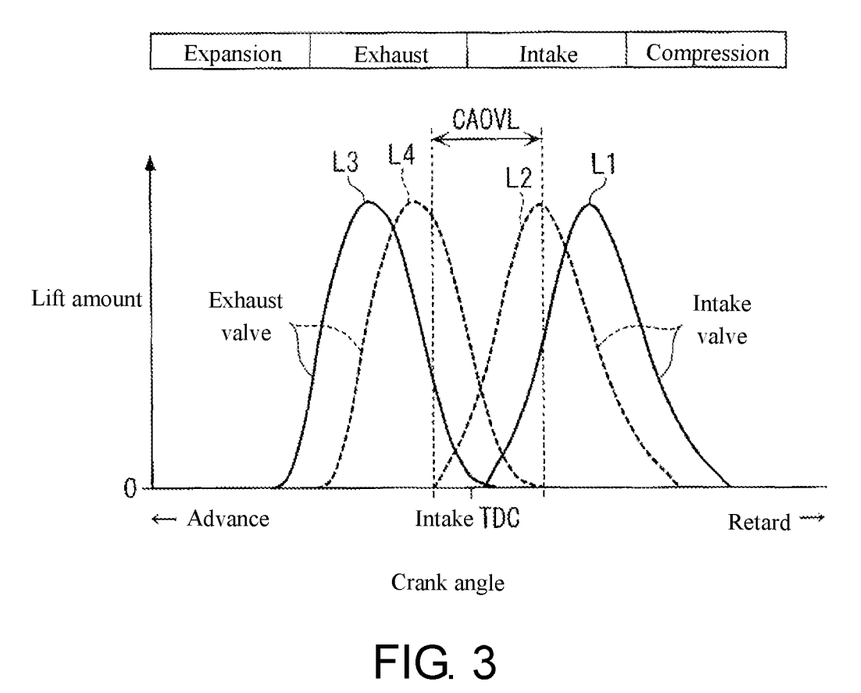
FIG. 3 shows valve lift characteristics of an intake valve and an exhaust valve.

The variable exhaust valve driving mechanism 50 is configured similarly to the variable intake valve driving mechanism 40, and continuously varies an operating phase (hereinafter "exhaust phase") CAEX of the exhaust valve between the most advanced phase shown by solid line L3 in FIG. 3 and the most retarded phase shown by broken line L4 in FIG. 3, by varying a phase of an exhaust camshaft (not illustrated) with respect to the crankshaft. By controlling an exhaust-side control valve 50a by a driving signal from the ECU 2, operation of the variable exhaust valve driving mechanism 50 is controlled (see FIG. 2).

According to the above configuration, in a state in which the intake air is supercharged by the turbocharger 9, when the intake phase CAIN is advanced and the exhaust phase CAEX is retarded, a valve overlap period CAOVL increases during which both the intake valve and the exhaust valve open in the vicinity of an intake top dead center (TDC). Accordingly, by causing "blow-by" (i.e., a portion of the intake air flowing into the combustion chamber via the intake valve just flows out as it is to the exhaust passage via the exhaust valve without contributing to combustion), a scavenging control that scavenges the gas remaining in the combustion chamber is executed.

In addition, besides the aforesaid intake pressure sensor 31, airflow sensor 32 and LAF sensor 33, a crank angle sensor 34, an intake cam angle sensor 35, an exhaust cam angle sensor 36, an accelerator opening degree sensor 37 detecting a depression amount (hereinafter "accelerator opening degree") AP of an accelerator pedal (not illustrated) of the vehicle, and other sensors (an engine water temperature sensor, an intake air temperature sensor or a vehicle speed sensor, etc.) not illustrated, are connected to the ECU 2, and detection signals of these sensors are input to the ECU 2.

With rotation of the crankshaft, the crank angle sensor 34 outputs a CRK signal and a TDC signal both being pulse signals. The CRK signal is output per predetermined crank angle (e.g., 30°). Based on the CRK signal, the ECU 2 calculates an engine speed NE. The TDC signal is a signal indicating that the piston is in the vicinity of the intake TDC in any cylinder. If the engine 3 is a four-cylinder engine, the TDC signal is output per crank angle of 180°.

In addition, with rotation of the intake camshaft and the exhaust camshaft, the intake cam angle sensor 35 and the exhaust cam angle sensor 36 respectively output an intake CAM signal and an exhaust CAM signal, both being pulse signals, per predetermined cam angle (e.g., 1°). The ECU 2 calculates the intake phase CAIN based on the above CRK signal and intake CAM signal, and calculates the exhaust phase CAEX based on the CRK signal and the exhaust CAM signal.

The ECU 2 is composed of a microcomputer including an input/output (I/O) interface, a central processing unit (CPU), a random-access memory (RAM) and a read-only memory (ROM) and so on. The ECU 2 discriminates an operating state of the engine 3 according to the detection signals of the aforesaid various sensors 31 to 37, and performs a fuel injection control by the fuel injection valve 5, an ignition timing control by the spark plug 6, a supercharging control by the wastegate valve 20, or a valve timing control by the variable intake valve driving mechanism 40 and the variable exhaust valve driving mechanism 50, and so on.

Particularly, in the present embodiment, an air-fuel ratio feedback control and the aforesaid scavenging control are executed by the ECU 2. The ECU 2 constitutes the feedback correction value calculation part, the reference feedback correction value setting part, the scavenging control part, the gain reduction control part, the reference feedback correction value calculation part, and the initial value setting part of the disclosure.

Figure 4:
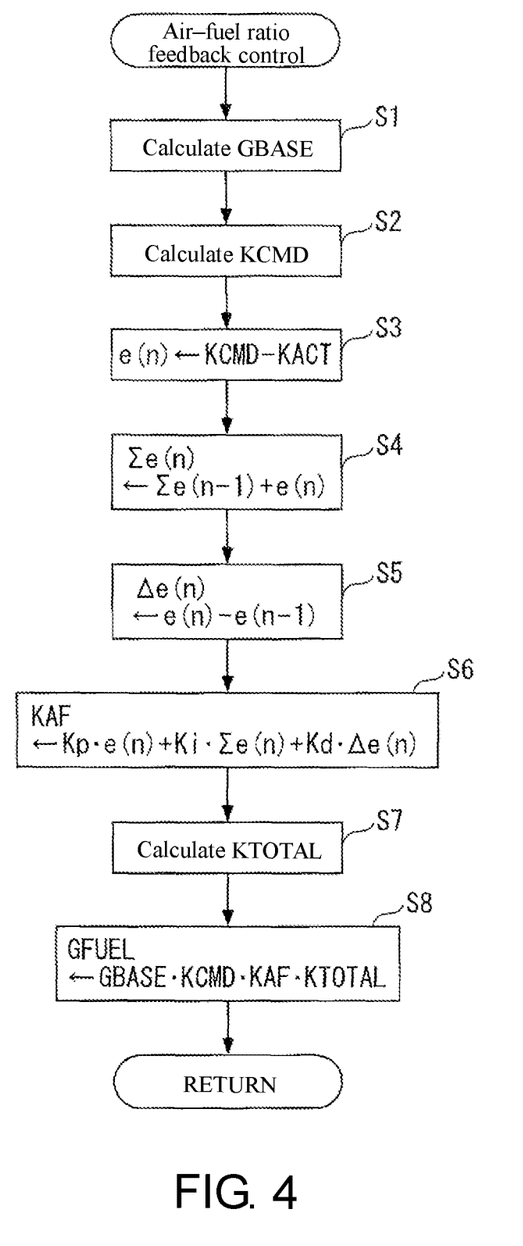
FIG. 4 is a flowchart showing air-fuel ratio feedback control processing.

FIG. 4 shows air-fuel ratio feedback control processing executed by the ECU 2. This processing is to perform the air-fuel ratio feedback control through the fuel injection amount GFUEL so that the detected equivalence ratio KACT detected by the LAF sensor 33 becomes a target equivalence ratio (target air-fuel ratio) KCMD, and is repeatedly executed synchronously with the occurrence of the TDC signal.

In the present processing, firstly, in step 1 (shown as "S1" in the drawings; the same applies hereinafter), a basic value GBASE of the fuel injection amount GFUEL is calculated. The calculation is performed, for example, by searching a predetermined map (not illustrated) according to the detected intake air flow rate GAIR. In this map, the basic value GBASE is set so that the air-fuel ratio of the mixture almost becomes the theoretical air-fuel ratio.

Next, the target equivalence ratio KCMD is calculated (step 2). The target equivalence ratio KCMD is calculated by searching a predetermined map (not illustrated) according to a required torque TRQD and the engine speed NE. In this map, the target equivalence ratio KCMD is set to an equivalence ratio equivalent to the theoretical air-fuel ratio in a steady operating state of the engine 3 excluding during acceleration (when the throttle is fully open) or the like. Moreover, the above required torque TRQD is basically calculated so as to be proportional to the accelerator opening degree AP according to the accelerator opening degree AP and the engine speed NE.

Next, a deviation $e(n)$ between the target equivalence ratio KCMD and the detected equivalence ratio KACT is calculated (step 3). In addition, an integrated value $\Sigma e(n)$ of the deviation $e(n)$ is calculated by adding the present deviation $e(n)$ to a previous value $\Sigma e(n-1)$ of the integrated value $\Sigma e(n)$ (step 4), and a difference between the present deviation $e(n)$ and the previous deviation $e(n-1)$ is calculated as a deviation change amount $\Delta e(n)$ (step 5).

Next, an air-fuel ratio feedback correction coefficient (hereinafter "F/B correction coefficient") KAF is calculated by the following equation (1) using predetermined gains (a P-term gain Kp, an I-term gain Ki and a D-term gain Kd) (step 6).

$$KAF=Kp \cdot e(n)+Ki \cdot \Sigma e(n)+Kd \cdot \Delta e(n) \quad (1)$$

Next, a total correction coefficient KTOTAL is calculated (step 7). The total correction coefficient KTOTAL is obtained by multiplying together the other correction coefficients (e.g., a water temperature correction coefficient corresponding to a detected engine water temperature or an intake air temperature correction coefficient corresponding to a detected intake air temperature, etc.) set according to the operating state of the engine 3.

Finally, according to the following equation (2), the fuel injection amount GFUEL is calculated by multiplying the basic value GBASE by the target equivalence ratio KCMD, the F/B correction coefficient KAF and the total correction coefficient KTOTAL (step 8), and the processing in FIG. 4 is ended.

$$GFUEL=GBASE \cdot KCMD \cdot KAF \cdot KTOTAL \quad (2)$$

Next, scavenging control processing according to a first embodiment is explained with reference to FIG. 5 and FIG. 6. This processing is to execute or prohibit the scavenging control and to accordingly perform setting of a gain of the air-fuel ratio feedback control, and is repeatedly executed by the ECU 2 at predetermined periods $\Delta T$.

In the present processing, firstly, in step 11, whether or not a scavenging control request flag F_SCAVREQ is "1" is discriminated. When a deviation between a target intake pressure POBJ and the actual intake pressure PBA (supercharging pressure) has become equal to or greater than a predetermined value with depression of the accelerator pedal or the like, by a separate processing not illustrated, the scavenging control request flag F_SCAVREQ is set to "1" from the viewpoint that the scavenging control should be executed; after that, when the intake pressure PBA reaches the target intake pressure POBJ, the scavenging control request flag F_SCAVREQ is reset to "0." Moreover, the target intake pressure POBJ is calculated based on the required torque TRQD and the engine speed NE.

When the answer in step 11 is NO and the scavenging control is not requested, a later-described scavenging control stop counter value CT_SSTP is set to a predetermined value CTREF1 (step 12A), and a stop counter subtraction flag F_CT_SSTP that instructs to stop subtraction of the scavenging control stop counter is set to "0" (step 12B). In addition, from the viewpoint of not executing the scavenging control, a scavenging control flag F_SCAVCTL is set to "0" (step 13A), and a VTC (the variable intake valve driving mechanism 40 and the variable exhaust valve driving mechanism 50) is driven to a steady position for normal operation (step 13B). Specifically, the intake phase CAIN and the exhaust phase CAEX are controlled to be values corresponding to the required torque TRQD and the engine speed NE.

When the answer in step 11 is YES, whether or not a scavenging control stop request flag F_SCAVSTP is "1" is discriminated (step 14). As described later, the scavenging control stop request flag F_SCAVSTP is set to "1" when it is determined that the scavenging control in execution should be stopped. Therefore, when the answer in step 14 is YES, from the viewpoint of stopping the scavenging control, the processing proceeds to step 13, and the scavenging control flag F_SCAVCTL is set to "0."

On the other hand, when the answer in step 14 is NO, from the viewpoint that execution conditions for the scavenging control are satisfied, the scavenging control flag F_SCAVCTL is set to "1" (step 15A), and the VTC is driven to a scavenging position (step 15B). Specifically, the intake phase CAIN is controlled to be a predetermined value on an advance side, and the exhaust phase CAEX is controlled to be a predetermined value on a retard side. Accordingly, in the state in which the intake air is supercharged by the turbocharger 9, by increasing the valve overlap period CAOVL and causing blow-by of the intake air, the scavenging control that scavenges the gas remaining in the combustion chamber is executed.

In step 16A subsequent to step 13B or step 15B, whether or not the VTC is in the above-mentioned steady position is discriminated. When the answer thereto is NO, a scavenging operation state flag F_SCAVOPRN is set to "1" (step 16B). Next, whether or not a scavenging area flag F_SCAVAREA is "1" is discriminated (step 17). In a case where, for example, the intake pressure PBA, the intake phase CAIN and the exhaust phase CAEX belong to a scavenging area defined in a predetermined map (not illustrated), by a separate processing not illustrated, it is determined that a predetermined amount or more of scavenging is actually occurring and the scavenging area flag F_SCAVAREA is set to "1."

When the answer in step 17 is YES, whether or not the F/B correction coefficient KAF calculated in step 6 in FIG. 4 is greater than a reference F/B correction coefficient KREFX is discriminated (step 18). The reference F/B correction coefficient KREFX is a learning value of the F/B correction coefficient KAF calculated before the start of the scavenging control. This learning value is calculated by applying leveling processing to the F/B correction coefficient KAF calculated during the air-fuel ratio feedback control and when predetermined conditions (e.g., the engine speed NE being equal to or lower than a predetermined speed, load of the engine 3 being within a predetermined range, an air-fuel ratio fluctuation amount being equal to or less than a predetermined value, etc.) so as to achieve stable combustion in the engine 3 are satisfied.

When the answer in step 18 is YES, i.e., during execution of the scavenging control, when it is determined that scavenging is occurring, and the F/B correction coefficient KAF increases relative to the reference F/B correction coefficient KREFX and is changing in a direction of further correcting the fuel injection amount GFUEL to a rich side, it is determined that there is a risk of the air-fuel ratio of the mixture being excessively corrected to the rich side due to the influence of the scavenging control.

In this case, after a later-described transition counter value CT_TRNS is set to a predetermined value CTREF2 (step 19), a gain used in the air-fuel ratio feedback control in FIG. 4 is reduced (step 20A). Specifically, the P-term gain Kp, the I-term gain Ki and the D-term gain Kd, for example, are respectively set to smaller second predetermined values Kp2, Ki2 and Kd2. Hereinafter, a control that reduces the gain of the air-fuel ratio feedback control during the scavenging control in this way is referred to as "gain reduction control," and a control outside the gain reduction control that sets the gain to a normal value is referred to as "normal control."

Next, the stop counter subtraction flag F_CT_SSTP is set to "1" (step 20B), and an F/B correction coefficient initial value KAFINI representing a KAF value at the start of the above gain reduction control is maintained at a previous value thereof (step 21).

On the other hand, when the answer in step 16A is YES and the VTC is in the steady position, the scavenging operation state flag F_SCAVOPRN is set to "0" (step 16C), and the processing proceeds to step 22 to decrement the transition counter value CT_TRNS set in step 19. In addition, when the answer in step 17 or step 18 is NO, i.e., when it is determined that no scavenging occurs, or when the F/B correction coefficient KAF is not changing to the rich side, it is determined that there is no risk of the air-fuel ratio of the mixture being excessively corrected to the rich side due to the influence of scavenging, and the processing proceeds to step 22 to decrement the transition counter value CT_TRNS.

Next, whether or not the transition counter value CT_TRNS is 0 or less is discriminated (step 23); when the answer thereto is YES, the gain of the feedback control is set to the normal value, and the normal control is executed (step 24). Specifically, the P-term gain Kp, the I-term gain Ki and the D-term gain Kd are respectively set to greater first predetermined values Kp1, Ki1 and Kd1. Next, the F/B correction coefficient KAF at that moment is set as the F/B correction coefficient initial value KAFINI (step S25).

On the other hand, when the answer in step 23 is NO and the transition counter value CT_TRNS is greater than 0, i.e., when time equivalent to the predetermined value CTREF2·ΔT (an execution period of the present processing) has not elapsed after the VTC has returned to the steady position with termination of the scavenging control or after execution conditions for the gain reduction control have not been satisfied during the gain reduction control, the processing proceeds to step 20 to continue with the gain reduction control.

Figure 6:
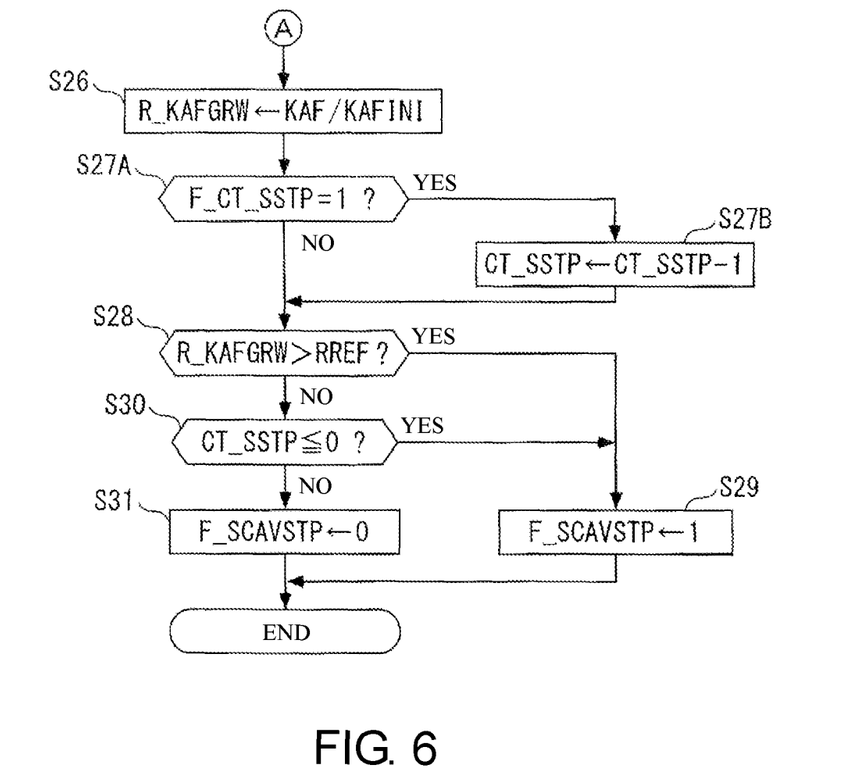
FIG. 6 is a timing chart showing a remaining part of the processing in FIG. 5 and FIG. 8.

Subsequent to step 21 or step 25, in step 26 in FIG. 6, by dividing the F/B correction coefficient KAF at that moment by the F/B correction coefficient initial value KAFINI, an F/B correction coefficient growth rate R_KAFGRW is calculated. As clear from this definition, the F/B correction coefficient growth rate R_KAFGRW indicates a degree of growth (increase) of the F/B correction coefficient KAF from the start of the gain reduction control.

Next, whether or not the stop counter subtraction flag F_CT_SSTP is "1" is discriminated (step 27A), and when the answer thereto is YES, the scavenging control stop counter value CT_SSTP set in step 12 is decremented (step 27B) and the processing proceeds to next step 28. On the other hand, when the answer in step 27A is NO, the processing directly proceeds to step 28.

In step 28, whether or not the F/B correction coefficient growth rate R_KAFGRW calculated in step 26 has exceeded a predetermined value RREF is discriminated. When the answer thereto is YES, even though the gain reduction control has been executed, since the degree of growth of the F/B correction coefficient KAF from the start of the gain reduction control has become too large, it is determined that the scavenging control should be stopped, the scavenging control stop request flag F_SCAVSTP is set to "1" (step 29), and the present processing is ended. If step 29 is executed, in the next processing cycle the answer in step 14 becomes YES, and the scavenging control is forcibly stopped.

When the answer in step 28 is NO, whether or not the scavenging control stop counter value CT_SSTP is 0 or less is discriminated (step 30). When the answer thereto is YES, i.e., when time equivalent to the predetermined value CTREF1·ΔT has elapsed after the gain reduction control is started, it is determined that the scavenging control should be stopped, and the processing proceeds to step 29 to set the scavenging control stop request flag F_SCAVSTP to "1." Accordingly, in the next processing cycle the scavenging control is forcibly stopped.

On the other hand, when the answer in both steps 28 and 30 is NO, the scavenging control stop request flag F_SCAVSTP is set to "0" (step 31), and the present processing is ended. In this case, the scavenging control continues to be executed.

Figure 5:
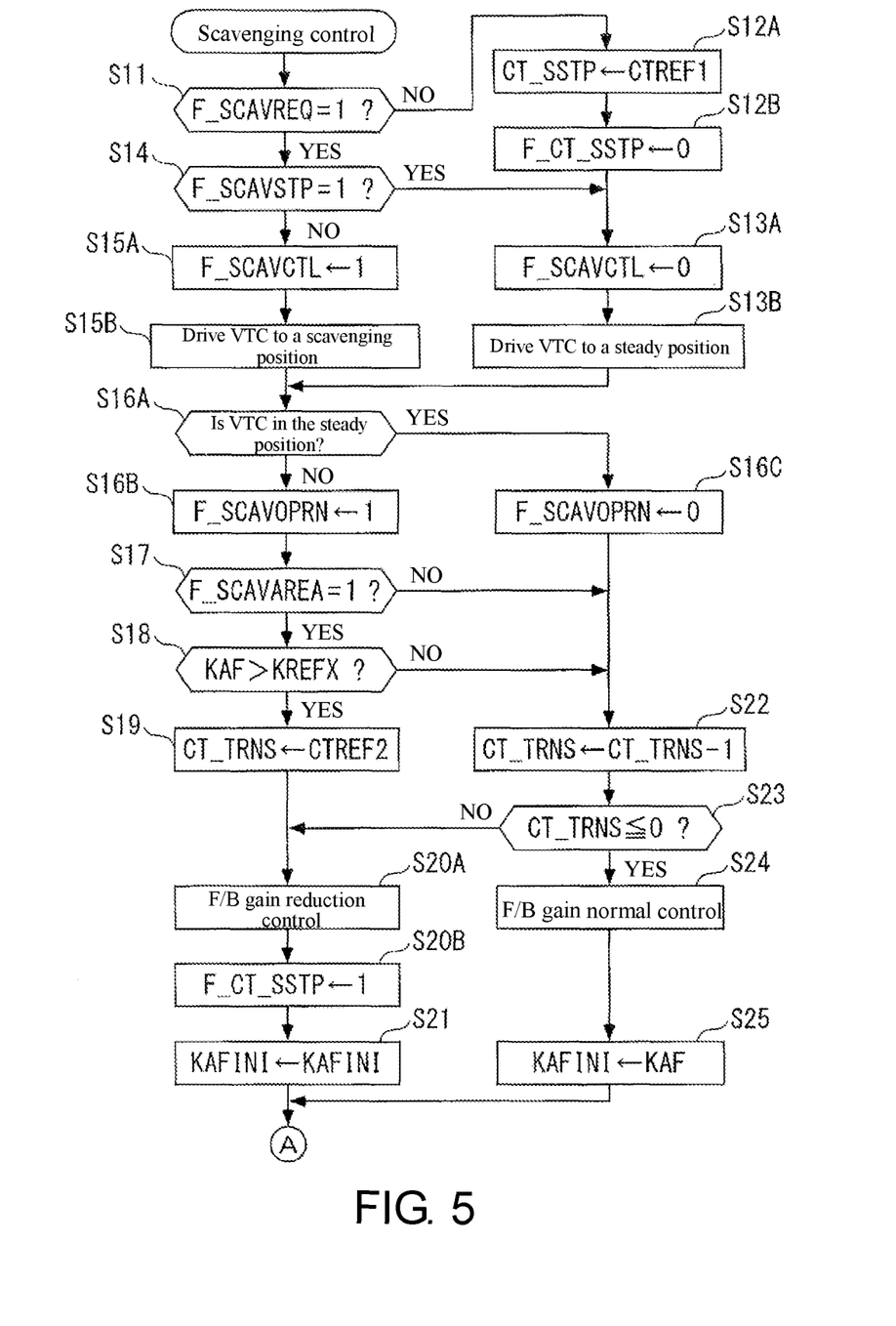
FIG. 5 is a flowchart showing a part of scavenging control processing according to a first embodiment.
Figure 7:
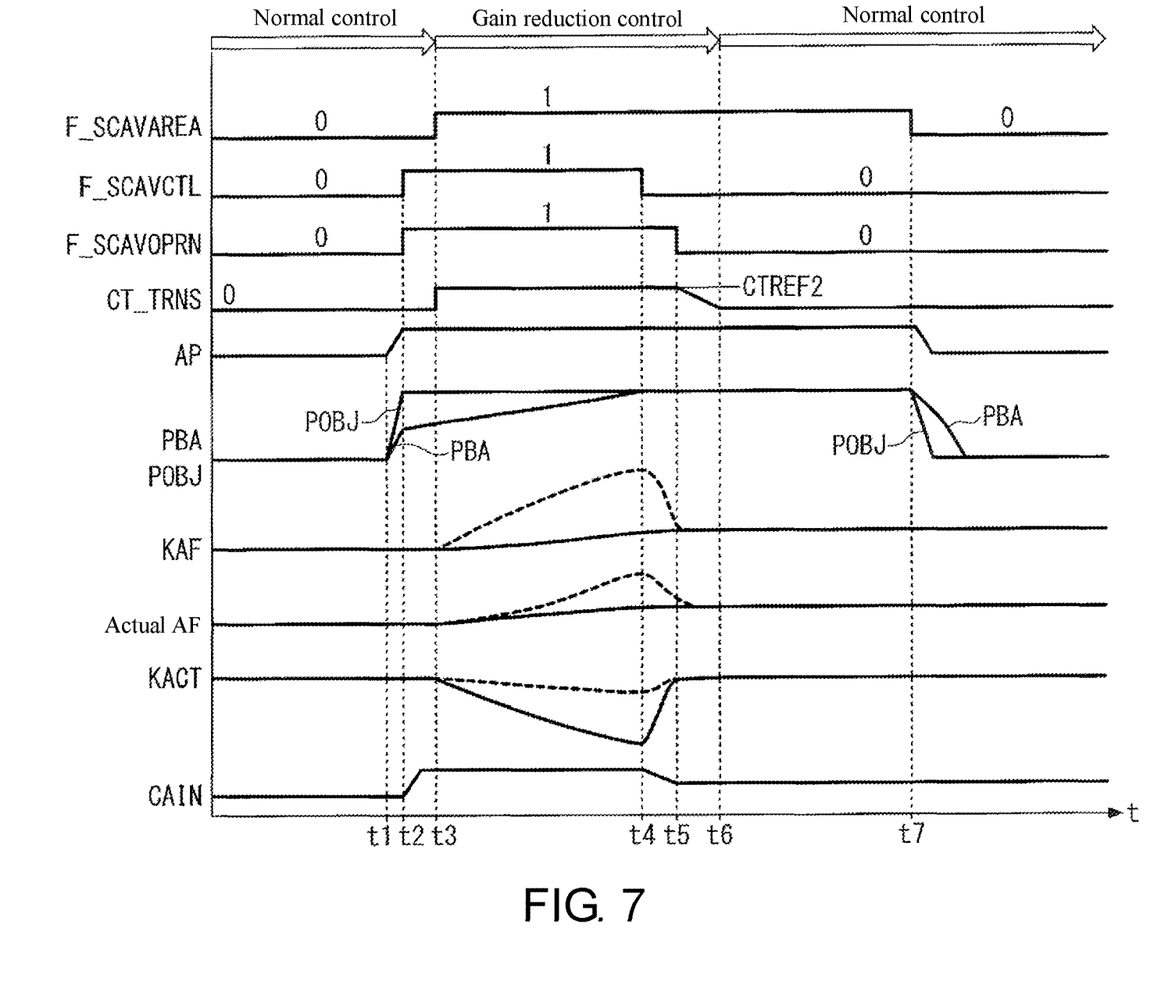
FIG. 7 is a timing chart showing an operation example obtained by the processing in FIG. 4 to FIG. 6.

Next, an operation example obtained by the processing in FIG. 4 to FIG. 6 explained so far is explained together with a comparative example, with reference to FIG. 7. Firstly, at time t1, when the accelerator pedal is depressed and the accelerator opening degree AP increases, as the target intake pressure POBJ increases, the turbocharger 9 operates and supercharging is started. In addition, when the deviation between the target intake pressure POBJ and the intake pressure PBA has become equal to or greater than the predetermined value (at time t2), by setting the scavenging control flag F_SCAVCTL to "1" and accordingly driving the VTC to the scavenging position, the intake phase CAIN is set to the predetermined value on the advance side and the exhaust phase CAEX is set to the predetermined value on the retard side (omitted from the drawings), and the scavenging control is started.

After that, if it is determined that scavenging is occurring, the scavenging area flag F_SCAVAREA is set to "1" (at time t3); accordingly, the gain reduction control is started, and the transition counter value CT_TRNS is set to the predetermined value CTREF2. Due to the gain reduction control, the gain is reduced, and responsiveness of the feedback control is lowered. Accordingly, as shown in solid line in FIG. 7, even if the detected equivalence ratio KACT has greatly changed to a lean side due to the influence of the scavenging control, the F/B correction coefficient KAF is suppressed from changing to the rich side, and the actual air-fuel ratio (actual AF) of the mixture is accordingly suppressed from changing to the rich side, thereby preventing excessive enrichment.

In contrast, the broken lines in FIG. 7 show a comparative example of a case where no gain reduction control is executed. That is, in this case, by setting the gain of the feedback control to the normal value, the F/B correction coefficient KAF greatly changes to the rich side. As a result, while the detected equivalence ratio KACT is suppressed from changing to the lean side, the actual air-fuel ratio (actual AF) of the mixture greatly changes to the rich side, and excessive enrichment occurs.

After that, when the intake pressure PBA reaches the target intake pressure POBJ (at time t4), in response to the fact that the scavenging control flag F_SCAVCTL is set to "0," driving of the VTC to the steady position is started. After that, when the VTC reaches the steady position (at time t5), the scavenging operation state flag F_SCAVOPRN is set to "0," the scavenging control is terminated, and the decrement of the transition counter value CT_TRNS is started. Then, when the transition counter value CT_TRNS has become 0 (at time t6), the gain reduction control is terminated, and the processing returns to the normal control. In this example, afterward, at time t7, it is determined that the occurrence of scavenging has ended, and the scavenging area flag F_SCAVAREA is set to "0".

As described above, according to the present embodiment, by executing the gain reduction control during the scavenging control, the gain of the air-fuel ratio feedback control is reduced to be lower than during the normal control. Accordingly, responsiveness of the feedback control is lowered, and the F/B correction coefficient KAF is suppressed from changing to the rich side. Thus, the air-fuel ratio of the mixture can be well controlled without being excessively enriched, and misfire caused by excessive enrichment of the air-fuel ratio can be reliably prevented. In addition, since it is sufficient to just reduce the gain of the feedback control during the scavenging control, the control is simple as compared to a conventional control device, and execution of the scavenging control can be ensured.

In addition, during the scavenging control, the gain reduction control is executed on the condition that the F/B correction coefficient KAF is greater than the reference F/B correction coefficient KREFX, i.e., that the F/B correction coefficient KAF is changing in the direction of further correcting the fuel injection amount GFUEL to the rich side. Accordingly, even during the scavenging control, in the case where the fuel injection amount GFUEL and the air-fuel ratio are actually not corrected to the rich side, unnecessary gain reduction control is avoided, and an air-fuel ratio feedback control using a gain by the normal control and having high responsiveness can be performed.

Furthermore, at termination of the scavenging control, when a predetermined time counted by the transition counter value CT_TRNS has elapsed after the VTC has returned to the steady position, since the processing transitions from the gain reduction control to the normal control, the influence of fresh air remaining in the exhaust passage immediately after the termination of scavenging is eliminated, and a sudden change in the air-fuel ratio at the transition can be prevented.

In addition, when the F/B correction coefficient growth rate R_KAFGRW, which indicates the degree of growth of the F/B correction coefficient KAF from the start of the gain reduction control, has exceeded the predetermined value RREF, the scavenging control is terminated. Accordingly, even though the gain reduction control has been executed, in the case where the growth of the feedback correction value from the start of the gain reduction control is becoming too large, by forcibly stopping the scavenging control, the misfire caused by excessive enrichment of the air-fuel ratio can be reliably prevented.

Next, scavenging control processing according to a second embodiment is explained with reference to FIG. 8. Moreover, FIG. 8 shows a part of the scavenging control processing that corresponds to FIG. 5, and the remaining part of the scavenging control processing is the same as that in FIG. 6. As clear from a comparison with FIG. 5, this scavenging control processing is obtained by adding steps 41 to 43 to the scavenging control processing according to the first embodiment. Specifically, after the gain reduction control is executed in step 20, the processing proceeds to step 41 in which whether or not the gain reduction control has been executed in the previous processing cycle is discriminated. When the answer thereto is NO and the present processing cycle is equivalent to the start of the gain reduction control, whether or not the F/B correction coefficient KAF is greater than the reference F/B correction coefficient KREFX is discriminated (step 42).

When the answer in step 42 is YES and KAF>KREFX is satisfied, the F/B correction coefficient KAF is set to the reference F/B correction coefficient KREFX (step 43), and the processing proceeds to step 26. On the other hand, when the answer in step 41 is YES or when the answer in step 42 is NO, steps 42 and 43 are skipped and the processing proceeds to step 26.

FIG. 9A and FIG. 9B show the operation of the aforesaid second embodiment together with the operation of the first embodiment. Firstly, in the first embodiment, as shown in FIG. 9A, the gain reduction control is started (steps 18 and 20) on the condition that the F/B correction coefficient KAF is richer than the reference F/B correction coefficient KREFX; also, the initial value of the F/B correction coefficient KAF at the start of the gain reduction control is set to the F/B correction coefficient KAF calculated at that moment. Accordingly, a sudden change in the fuel injection amount GFUEL and the air-fuel ratio at the start of the gain reduction control, as well as occurrence of a torque level difference in the engine 3 arising therefrom, can be prevented.

In contrast, according to the second embodiment, as shown in FIG. 9B, the gain reduction control is started on the same condition as that of the first embodiment; also, the initial value of the F/B correction coefficient KAF at the start of the gain reduction control is set to the reference F/B correction coefficient KREFX. Accordingly, in the case where the F/B correction coefficient KAF has been changing to the rich side before the start of the gain reduction control, the initial value of the F/B correction coefficient KAF can be set without being affected by the above, and therefore, the misfire caused by excessive enrichment of the air-fuel ratio can be reliably prevented.

Moreover, the disclosure is not limited to the explained embodiments, but can be implemented in various modes. For example, in the embodiments, both the intake phase CAIN and the exhaust phase CAEX are changed in order to obtain a valve overlap characteristic suitable for scavenging control; however, only one of the intake phase CAIN and the exhaust phase CAEX may be changed.

In addition, in the embodiments, in the gain reduction control, the P-term gain Kp, the I-term gain Ki and the D-term gain Kd are all reduced; however, any one or any two of the P-term gain Kp, the I-term gain Ki and the D-term gain Kd may be changed, or degrees of change of the three gains may be different from one another. In addition, although proportional-integral-derivative (PID) control is used as the feedback control, it is for sure that sliding mode control or the like may also be adopted in place of PID control.

Furthermore, in the embodiments, the F/B correction coefficient growth rate R_KAFGRW, obtained by dividing the F/B correction coefficient KAF at that moment by the F/B correction coefficient initial value KAFINI, is used as the growth degree parameter indicating the degree of growth of the F/B correction coefficient from the start of the gain reduction control; however, the disclosure is not limited thereto, and a difference between the F/B correction coefficient KAF and the F/B correction coefficient initial value KAFINI may also be used as the growth degree parameter.

In addition, although the embodiments are examples of applying the disclosure to a gasoline engine for vehicles, the disclosure is not limited thereto, and is applicable to engines in other forms, or engines for other uses, for example, an engine for ship propellers like an outboard motor in which a crankshaft is disposed in a vertical direction, and so on. In addition, detailed configurations may be properly changed within the spirit of the disclosure.

What is claimed is:

1. A control device of an internal combustion engine, the internal combustion engine comprising a supercharger that supercharges intake air, and being capable of changing a valve overlap characteristic between an intake valve and an exhaust valve, wherein the control device comprises:
    an air-fuel ratio sensor provided upstream of a turbine of the supercharger in an exhaust passage, detecting an air-fuel ratio of a mixture burning in a combustion chamber;
    a feedback correction value calculation part, calculating a feedback correction value for correcting a fuel injection amount so that a detected air-fuel ratio detected by the air-fuel ratio sensor becomes a target air-fuel ratio, by using a feedback control containing a predetermined gain;
    a reference feedback correction value setting part, setting a reference feedback correction value based on the feedback correction value;
    a scavenging control part, executing a scavenging control that scavenges the combustion chamber by causing a portion of the intake air flowing into the combustion chamber via the intake valve to flow out via the exhaust valve, by changing the valve overlap characteristic into a predetermined characteristic for scavenging control, in a state in which the intake air is supercharged by the supercharger; and
    a gain reduction control part, executing a gain reduction control that reduces the gain of the feedback control to be lower than during a normal control when the feedback correction value is changing relative to the reference feedback correction value in a direction of further correcting the fuel injection amount to a rich side during execution of the scavenging control.

2. The control device of an internal combustion engine according to claim 1, further comprising an initial value setting part, setting an initial value of the feedback correction value at the start of the gain reduction control to the feedback correction value calculated by the feedback correction value calculation part.

3. The control device of an internal combustion engine according to claim 1, wherein
    the reference feedback correction value is a learning value of the feedback correction value calculated before the start of the scavenging control, and
    the control device further comprises an initial value setting part setting an initial value of the feedback correction value at the start of the gain reduction control to the reference feedback correction value.

4. The control device of an internal combustion engine according to claim 1, wherein the gain reduction control part terminates the gain reduction control when a predetermined time has elapsed after termination of the scavenging control.

5. The control device of an internal combustion engine according to claim 1, further comprising a growth degree parameter calculation part calculating a growth degree parameter indicating a degree of growth of the feedback correction value from the start of the gain reduction control, wherein the scavenging control part terminates the scavenging control when the calculated growth degree parameter has exceeded a predetermined value.

6. The control device of an internal combustion engine according to claim 2, wherein the gain reduction control part terminates the gain reduction control when a predetermined time has elapsed after termination of the scavenging control.

7. The control device of an internal combustion engine according to claim 3, wherein the gain reduction control part terminates the gain reduction control when a predetermined time has elapsed after termination of the scavenging control.

8. The control device of an internal combustion engine according to claim 2, further comprising a growth degree parameter calculation part calculating a growth degree parameter indicating a degree of growth of the feedback correction value from the start of the gain reduction control, wherein the scavenging control part terminates the scavenging control when the calculated growth degree parameter has exceeded a predetermined value.

9. The control device of an internal combustion engine according to claim 3, further comprising a growth degree parameter calculation part calculating a growth degree parameter indicating a degree of growth of the feedback correction value from the start of the gain reduction control, wherein the scavenging control part terminates the scavenging control when the calculated growth degree parameter has exceeded a predetermined value.

10. The control device of an internal combustion engine according to claim 4, further comprising a growth degree parameter calculation part calculating a growth degree parameter indicating a degree of growth of the feedback correction value from the start of the gain reduction control, wherein the scavenging control part terminates the scavenging control when the calculated growth degree parameter has exceeded a predetermined value.

11. The control device of an internal combustion engine according to claim 6, further comprising a growth degree parameter calculation part calculating a growth degree parameter indicating a degree of growth of the feedback correction value from the start of the gain reduction control, wherein the scavenging control part terminates the scavenging control when the calculated growth degree parameter has exceeded a predetermined value.

12. The control device of an internal combustion engine according to claim 7, further comprising a growth degree parameter calculation part calculating a growth degree parameter indicating a degree of growth of the feedback correction value from the start of the gain reduction control, wherein the scavenging control part terminates the scavenging control when the calculated growth degree parameter has exceeded a predetermined value.

* * * * *